United States Patent

[11] 3,604,665

| [72] | Inventor | Truman K. Jamison<br>1019 Pike St., Crest Hotel, Seattle, Wash. 98101 |
|---|---|---|
| [21] | Appl. No. | 834,670 |
| [22] | Filed | June 19, 1969 |
| [45] | Patented | Sept. 14, 1971 |

[54] AIRCRAFT ARRESTING SYSTEM
4 Claims, 7 Drawing Figs.

[52] U.S. Cl. ..................................................... 244/110, 188/1, 188/67
[51] Int. Cl. ........................................................ B64f 1/02
[50] Field of Search............................................ 244/110, 63; 188/67, 1; 242/107, 107.5; 267/156, 12.2

[56] References Cited
UNITED STATES PATENTS

| 1,499,472 | 7/1924 | Pratt...................................... | 244/110 UX |
| 1,806,992 | 5/1931 | Fieux..................................... | 244/110 UX |
| 3,033,488 | 5/1962 | Weber.................................... | 242/107.5 |
| 3,057,440 | 10/1962 | Broudo................................... | 244/110 X |
| 3,139,249 | 6/1964 | Trifillis.................................. | 244/110 |
| 3,191,890 | 6/1965 | Adams.................................... | 244/110 |
| 3,220,216 | 11/1965 | Byrne et al............................ | 244/110 X |
| 3,358,612 | 12/1967 | Bleuer.................................... | 267/156 X |
| 3,502,289 | 3/1970 | Kelly et al............................. | 244/110 |

FOREIGN PATENTS

| 425,639 | 4/1911 | France................................... | 244/110 |
| 359,204 | 5/1938 | Italy....................................... | 244/110 |

*Primary Examiner*—Milton Buchler
*Assistant Examiner*—Paul E. Sauberer
*Attorney*—Seed, Berry & Dowrey

ABSTRACT: A plurality of spiral springs are secured to a frame mounted below an aircraft runway. The springs are fixed to a rotatable shaft upon which a pair of cable drums are secured. Cables are fed from the drums onto the runway surface in positions to be engaged by loops protruding from an aircraft. Brakes are provided to prevent the springs from accidentally unwinding after the airplane has come to a stop. Motors are provided to wind the springs so that the system may be employed to catapult aircraft from the runway. Several springs and cable arrangements are illustrated.

PATENTED SEP 14 1971

TRUMAN K. JAMISON
INVENTOR.

BY Seed, Berry & Dowrey
ATTORNEYS

TRUMAN K. JAMISON
*INVENTOR.*

BY *Seed, Berry & Dowrey*

ATTORNEYS

AIRCRAFT ARRESTING SYSTEM

BACKGROUND OF THE INVENTION

1. Field of the Invention

This invention pertains to aircraft arresting and catapulting systems and, more particularly, to such systems employing springs as the main energy source.

2. Description of the Prior Art

Aircraft arresting systems have been long known in the art. Some of these systems have employed elastic energy-absorbing means such as shown in the U.S. Pat. to Adams No. 3,191,890.

SUMMARY OF THE INVENTION

This invention pertains to an arresting system that employs an elastic energy-absorption means, in the form of spiral springs which are mounted on a rotatable shaft below ground beneath an aircraft runway. A cable is wound on a drum fixed to the shaft and thus is operatively coupled to the springs so that extending the cable will wind the springs. By providing the springs and accompanying supports beneath the ground the danger of an aircraft accidentally striking the springs or their mounting structure is eliminated. A spiral spring energy-absorption means is inexpensive to construct and simple to operate. The use of spiral spring arrangements also advantageously adapts itself to various mounting and cable arrangements.

A brake mechanism is included to stop and hold the cable in an extended position. In addition, motor means is provided to wind the springs to extend the cable. In this manner the arresting system may be employed to catapult aircraft from the runway.

DESCRIPTION OF THE PREFERRED EMBODIMENTS

Figure 1:
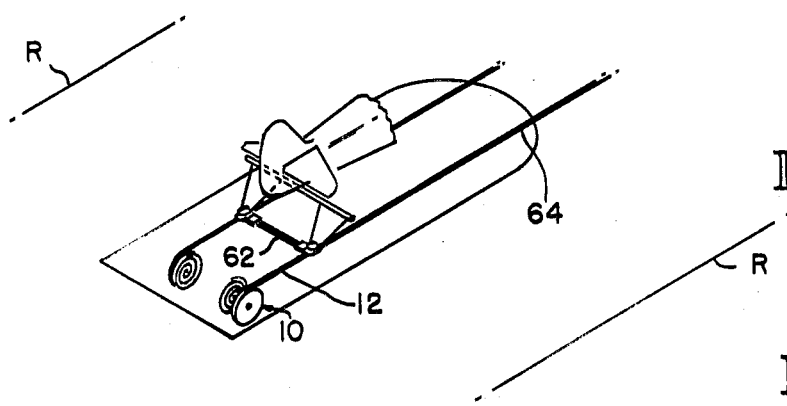
FIG. 1 is a schematic illustration of an aircraft being brought to rest with the aircraft-arresting system embodying the invention.
Figure 2:
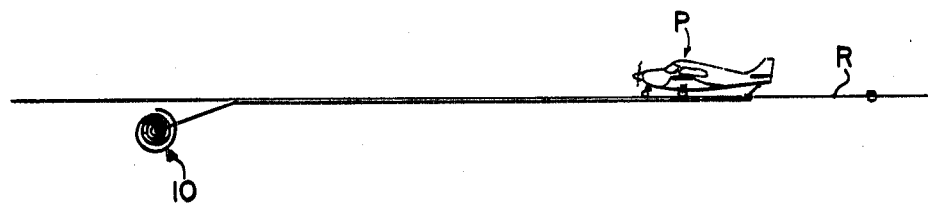
FIG. 2 is a schematic side elevation showing an aircraft in a position about to be catapulted using the system.

Referring to the drawings the aircraft-arresting system is employed approximately 300 feet from the end of runway R. The system includes energy-absorption means 10 and cables 12. The cables are engaged by conventional loops L depending from an aircraft P. The cables may be arranged to accommodate a hook on the plane. As is best shown in FIG. 1 engagement of the cables by the loops extends the cables which extension is resisted by the energy-absorption means 10 until the aircraft is finally brought to rest prior to the end of the runway.

Figure 3:
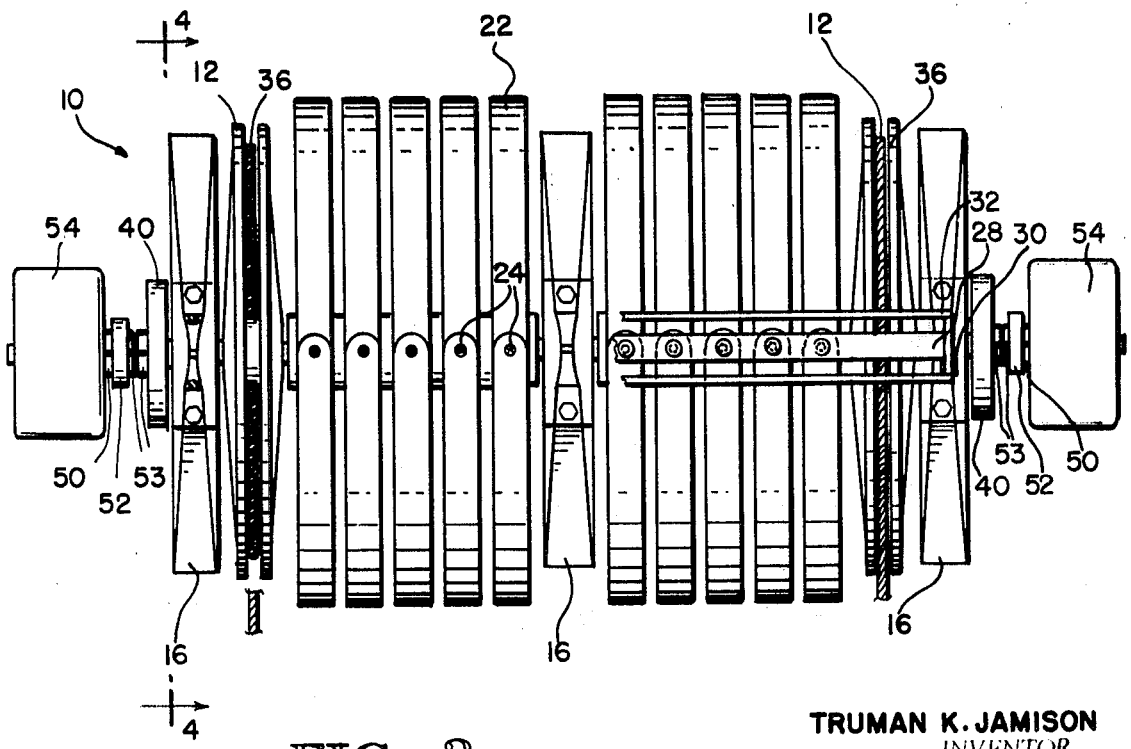
FIG. 3 is a plan view partly in horizontal section of the preferred form of aircraft-arresting system.
Figure 4:
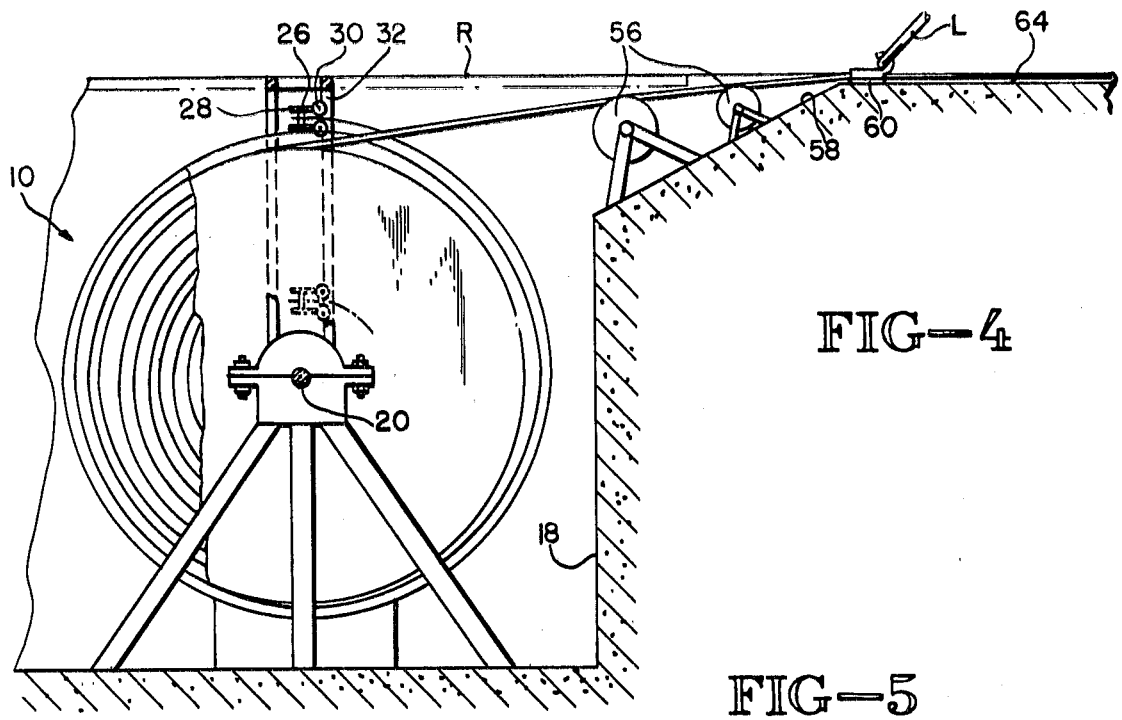
FIG. 4 is a vertical section taken along line 4—4 of FIG. 3.

The energy-absorption means 10 is best shown in FIGS. 3 and 4 and includes three spaced stanchions 16 that are mounted in a well 18 below the surface of the runway R. The stanchions are provided with conventional ball bearings which rotatably mount a shaft 20. A plurality of conventional spiral springs 22 are pinned at their inner ends as at 24 to the shaft 20. Although 10 springs are shown in the preferred form, any number of springs may be used depending upon the load requirements of the system. The free ends of the springs are secured in a movable clamp 26. The clamp includes an elongated clamp bar 28 that is secured at either end to roller carriages 30. The roller carriages ride against vertical bracket members 32 secured to the stanchions 16. The purpose of the movable clamps is to allow the free ends of the coil springs to move downwardly towards the shaft 20 as the springs become more tightly coiled.

A pair of cable drums 36 are fixed to the shaft 30 and contain wrapped coils of cable 12. Preferably between 200 and 300 feet of 1½ to 2-inch cable is employed. A conventional brake 40 is secured to the end stanchions and the shaft. The purpose to the brake is to hold the cables in an extended position with the springs wound either after a plane has been arrested or is about to be catapulted.

Coaxially aligned with the shaft 30 are a pair of motor shafts 50 releasably connected to the shaft 30 by a slidable collar 52. The collar has conventional splines, not shown, that engage groove 53 in the aligned shafts. A conventional electric induction motor 54 is secured to each motor shaft. The purpose of the motors 54 is to wind the coil springs 22 to extend the cable 12 so that the springs may be used to catapult an aircraft from the runway. In addition, the motors may also serve to provide regenerative braking to allow the gradual return of an extended cable.

In the preferred embodiment the cable 12 is guided by two sets of pulleys 56 mounted in an incline 58 which communicates with the well 18. The cables terminate in slide blocks 60 having upwardly extending hooks 61. The slide blocks 60 slide in alleys 64 a few inches in depth that run along both sides of the runway R. The slide blocks are joined by a set of cables 62 which assures that both cables 12 will be pulled from their drums should only a single loop L engage a hook 61.

Figure 5:
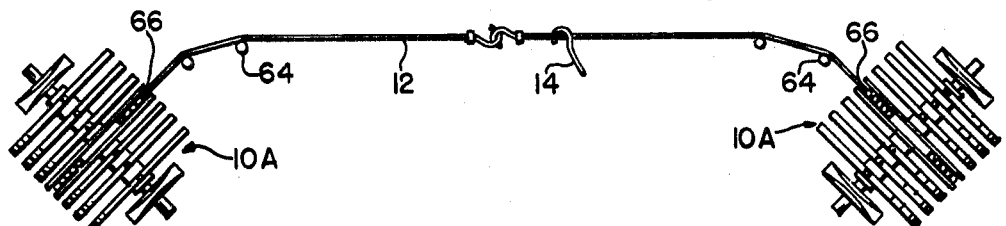
FIG. 5 is a plan of a modified form of arresting system.

In the modification shown in FIG. 5 the cables 12 are not run in alleys as in the preferred embodiment but are guided by vertical guideposts 64. In this modified form the energy-absorbing means 10A includes a pair of identical units each of which employs a single central cable drum 66 and only six spiral springs 22. In all other respects the units of the energy-absorbing means 10A is identical with that of the preferred embodiment.

Figure 6:
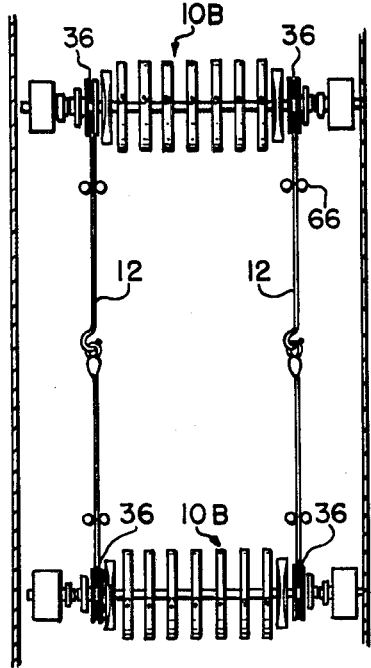
FIG. 6 is a plan of still another form of aircraft-arresting system.
Figure 7:
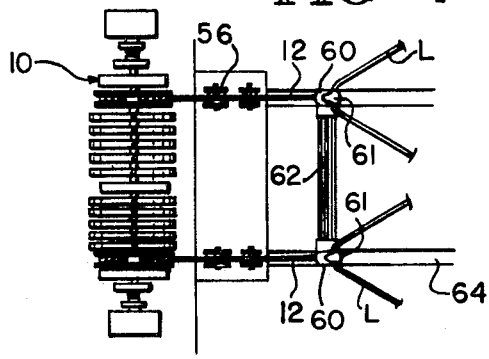
FIG. 7 is a plan of the preferred form of aircraft-arresting system.

In the modification shown in FIG. 6 the energy-absorbing means 10B is again separated into two identical units, one on each side of the runway. The units are connected by two sets of cables 12 that are wound on the respective cable drums 36. The cables are guided by sets of guideposts 66. In this modification the energy-absorbing units 10B are placed approximately midway along the length of the runway and are used to arrest an aircraft landing on the runway from either direction.

The embodiments of the invention in which an exclusive property or privilege is claimed are defined as follows:

1. An aircraft-arresting system comprising: energy-absorbing means positioned below ground and an elongated cable above ground operatively secured to said energy-absorbing means; said energy-absorbing means including frame means, a shaft rotatably mounted on said frame means, a plurality of spiral springs secured at their inner ends to said shaft, means securing the free ends of said springs against rotation, at least one cable drum fixed on said shaft, said elongated cable being wrapped around said cable drum whereby unwinding of said cable coils said springs, brake means for selectively precluding rotation of said shaft, a motor for selectively coiling said springs, a second cable drum mounted on said shaft spaced from said first drum, each drum having a cable wrapped thereon and terminating in a hook, a runway having a pair of alleys running along the lateral edges thereof, and sliding blocks in said alleys and joined to one another by a plurality of cables, said hooks at the terminal ends of said cables being adapted to be engaged by loops depending from an aircraft.

2. An aircraft-arresting system comprising: energy-absorbing means positioned below ground and an elongated cable above ground operatively secured to said energy-absorbing means; said energy-absorbing means including frame means, a shaft rotatably mounted on said frame means, a plurality of spiral springs secured at their inner ends to said shaft, means securing the free ends of said springs against rotation, said means securing the free ends of said springs including a clamp movably mounted on said frame means, at least one cable drum fixed on said shaft, said elongated cable being wrapped around said cable drum whereby unwinding of said cable coils said springs, brake means for selectively precluding rotation of said shaft, and a motor for selectively coiling said springs.

3. The system defined by claim 2 wherein said clamp includes an elongated clamp bar, roller carriages secured to the ends of said clamp bar, and vertical brackets against which said roller carriages are moved.

4. The system defined by claim 2 further including a pair of alleys running along the lateral edges of the runway, a sliding block in each alley, a cable secured respectively to a cable drum and a sliding block and means securing said sliding blocks together across the runway.